United States Patent
Takeyama (10) Patent No.: US 10,651,485 B2
(45) Date of Patent: May 12, 2020

(54) FUEL CELL SYSTEM

(71) Applicant: TOYOTA JIDOSHA KABUSHIKI KAISHA, Toyota-shi, Aichi-ken (JP)

(72) Inventor: Makoto Takeyama, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 267 days.

(21) Appl. No.: 15/955,981

(22) Filed: Apr. 18, 2018

(65) Prior Publication Data

US 2018/0309143 A1    Oct. 25, 2018

(30) Foreign Application Priority Data

Apr. 20, 2017    (JP) .................. 2017-083288

(51) Int. Cl.

| | |
|---|---|
| *H01M 8/04082* | (2016.01) |
| *F16K 31/14* | (2006.01) |
| *H01M 8/0258* | (2016.01) |
| *F16K 27/02* | (2006.01) |
| *H01M 8/2483* | (2016.01) |
| *H01M 8/04291* | (2016.01) |
| *H01M 8/04746* | (2016.01) |
| *H01M 8/0247* | (2016.01) |
| *F16K 47/14* | (2006.01) |
| *H01M 8/04223* | (2016.01) |
| *H01M 8/04089* | (2016.01) |

(52) U.S. Cl.
CPC ..... *H01M 8/04082* (2013.01); *F16K 27/0218* (2013.01); *F16K 31/14* (2013.01); *F16K 47/14* (2013.01); *H01M 8/0247* (2013.01); *H01M 8/0258* (2013.01); *H01M 8/04089* (2013.01); *H01M 8/04201* (2013.01); *H01M 8/04253* (2013.01); *H01M 8/04291* (2013.01); *H01M 8/04746* (2013.01); *H01M 8/2483* (2016.02); *H01M 2250/20* (2013.01); *Y02T 90/32* (2013.01)

(58) Field of Classification Search
None
See application file for complete search history.

(56) References Cited

U.S. PATENT DOCUMENTS

| | | | | |
|---|---|---|---|---|
| 5,140,966 A | * | 8/1992 | Wong ............. | F02M 17/20 |
| | | | | 123/543 |
| 9,480,359 B1 | * | 11/2016 | Kalenian ............ | A23F 5/262 |

(Continued)

FOREIGN PATENT DOCUMENTS

| | | |
|---|---|---|
| JP | 2002-373687 | 12/2002 |
| JP | 2006-172917 | 6/2006 |
| JP | 2007182840 A * | 7/2007 |

*Primary Examiner* — Tracy M Dove
(74) *Attorney, Agent, or Firm* — Finnegan, Henderson, Farabow, Garrett & Dunner, LLP (57) ABSTRACT

To suppress increase of a pressure loss in a channel and blocking of the channel due to water adhering to a rectification mesh provided downstream of a butterfly valve. A fuel cell system includes: a butterfly valve provided on a pipe between a fuel cell and another component; and a rectification mesh provided on a downstream side of gas flowing in the pipe relative to the butterfly valve, a mesh that rectifies a flow of the gas being formed in the rectification mesh. The rectification mesh has, in its lower end part in a vertical direction, a first opening part in which the mesh is not formed.

4 Claims, 7 Drawing Sheets

(56) References Cited

U.S. PATENT DOCUMENTS

| | | | | |
|---|---|---|---|---|
| 2010/0279191 | A1* | 11/2010 | Matsuura | H01M 8/04164 |
| | | | | 429/443 |
| 2015/0303498 | A1* | 10/2015 | Nakamura | F16K 27/0218 |
| | | | | 429/434 |
| 2017/0077534 | A1* | 3/2017 | Guidry | H01M 8/04111 |
| 2018/0320790 | A1* | 11/2018 | Fukui | F16K 31/535 |

* cited by examiner

FUEL CELL SYSTEM

CROSS REFERENCE TO RELATED APPLICATIONS

The present application claims the priority based on Japanese Patent Application No. 2017-083288 filed on Apr. 20, 2017, the disclosure of which is hereby incorporated by reference in its entirety.

BACKGROUND

Field

The disclosure relates to a fuel cell system.

Related Art

Japanese Patent Laid-Open No. 2002-373687 discloses a technology in a fuel cell system that generates electric power with a fuel cell under the supply of hydrogen and oxygen. In the technology, a metal mesh is provided on a pipe connecting the fuel cell and another component together in order to suppress vibration caused by turbulence and to suppress noise.

In a fuel cell, water is generated through an electrochemical reaction between hydrogen and oxygen. When this generated water adheres to a metal mesh provided on a pipe, a pressure loss increases in a channel of the pipe on which the metal mesh is provided. Moreover, when the generated water freezes while adhering to the metal mesh, blocking of the channel occurs.

The disclosure is devised in order to address the aforementioned problems and can be realized as the following aspects.

SUMMARY

According to an aspect of the disclosure, a fuel cell system is provided. This fuel cell system has: a butterfly valve provided on a pipe between a fuel cell and another component; and a rectification mesh provided on a downstream side of the butterfly valve along a direction of flow of gas flowing in the pipe. The rectification mesh has a mesh that rectifies a flow of the gas. The rectification mesh has a first opening part in its lower end part in a vertical direction. The mesh is not formed in the first opening part.

DETAILED DESCRIPTION

A. Embodiment

Figure 1:
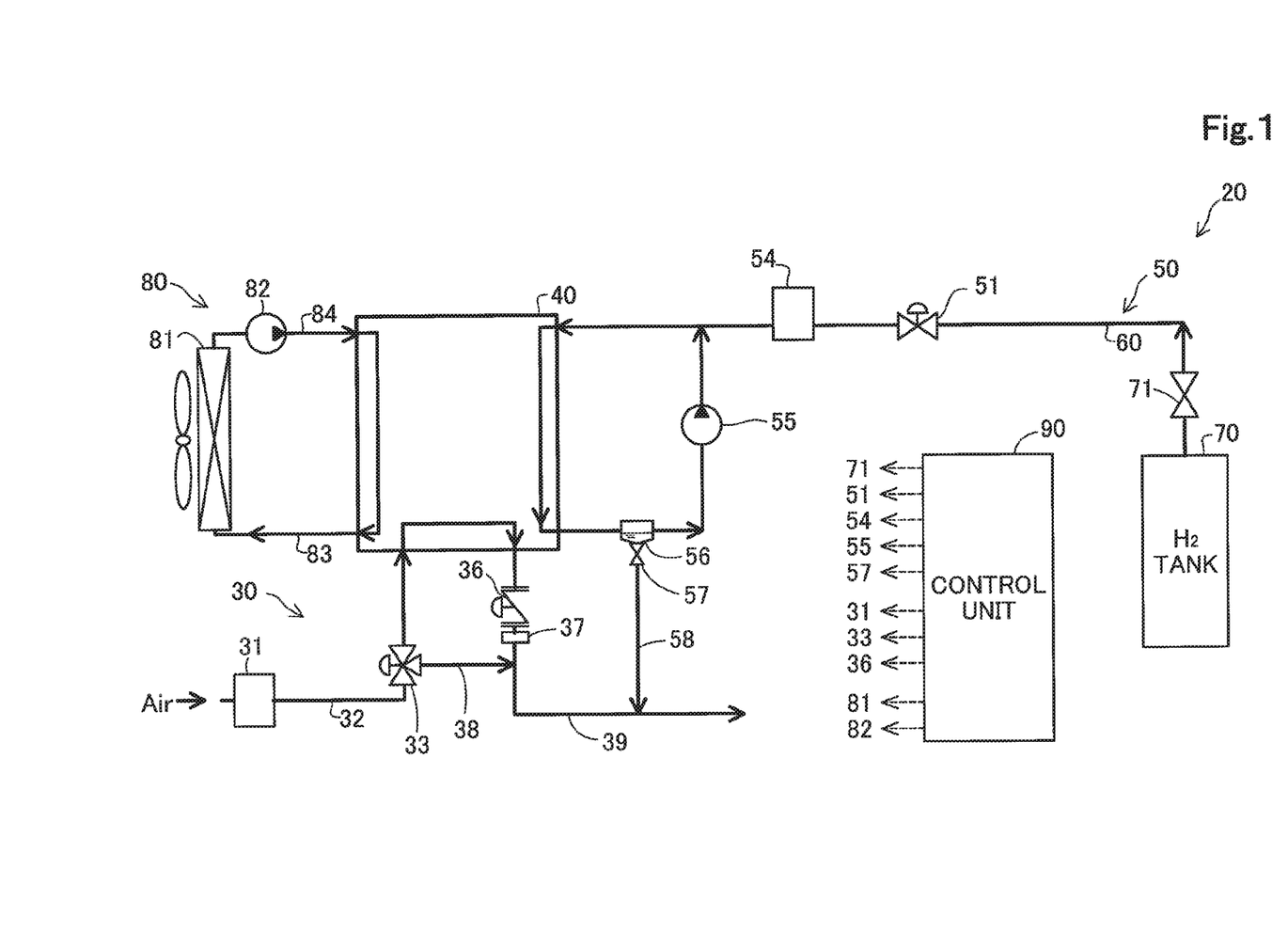
FIG. 1 is an explanatory diagram showing a schematic configuration of a fuel cell system of an embodiment of the disclosure.

FIG. 1 is an explanatory diagram showing a schematic configuration of a fuel cell system 20 as an embodiment of the disclosure. The fuel cell system 20 is implemented, for example, in a vehicle and outputs electric power which is a power source of the vehicle in accordance with a request from a driver. The fuel cell system 20 includes a fuel cell 40 including a plurality of unit cells, a hydrogen feed and discharge mechanism 50, an air feed and discharge mechanism 30, a cooling water circulation mechanism 80 and a control unit 90. The fuel cell system 20 is started by an ON operation of a not-shown power switch and stopped by an OFF operation thereof. The power switch corresponds to an ignition switch in an engine vehicle. The power switch is an input interface for switching the fuel cell system 20 between its stopped state and its operating state.

The hydrogen feed and discharge mechanism 50 feeds and discharges hydrogen as fuel gas to/from an anode of the fuel cell 40 in accordance with control of the control unit 90. The hydrogen feed and discharge mechanism 50 includes a hydrogen tank 70, a shut-off valve 71, a hydrogen feed channel 60, a regulator 51, a hydrogen pump 55, a gas liquid separation unit 56, a discharged water shut-off valve 57, a discharge channel 58 and an injector 54.

The hydrogen tank 70 stores hydrogen. In the hydrogen tank 70, high pressure hydrogen gas at tens of megapascals is stored. The hydrogen feed channel 60 is a pipe connecting the fuel cell 40 to the hydrogen tank 70 as a component other than the fuel cell 40. The shut-off valve 71 is a valve which stops supply of hydrogen from the hydrogen tank 70 to the hydrogen feed channel 60, and is also called a main shut-off valve. The shut-off valve 71 is controlled by the control unit 90 to be opened and closed. When the shut-off valve 71 is opened in accordance with control of the control unit 90, hydrogen gas is fed to the fuel cell 40 from the hydrogen tank 70 via the hydrogen feed channel 60. When the shut-off valve 71 is closed, the supply of hydrogen gas is stopped.

The regulator 51 regulates the pressure of hydrogen stored in the hydrogen tank 70 in accordance with control of the control unit 90. The injector 54 injects hydrogen whose pressure is regulated by the regulator 51 toward the anode in accordance with control of the control unit 90.

The gas liquid separation unit 56 separates gas and liquid from each other which are discharged from the anode. The hydrogen pump 55 feeds the gas separated by the gas liquid separation unit 56 again to the fuel cell 40. The gas separated by the gas liquid separation unit 56 mainly contains hydrogen that is discharged without being consumed, nitrogen that permeates through a membrane electrode assembly included in the fuel cell from the cathode side, and moisture that is not separated from the gas component by the gas liquid separation unit 56. The discharge channel 58 is a pipe connecting the gas liquid separation unit 56 to an air discharge channel 39 (mentioned later) included in the air feed and discharge mechanism 30. The discharged water shut-off valve 57 is provided on the discharge channel 58. The discharged water shut-off valve 57 is opened for discharging the liquid separated by the gas liquid separation unit 56 and nitrogen. A supply amount of hydrogen to the fuel cell 40 is regulated by controlling the injector 54 and the discharged water shut-off valve 57.

The air feed and discharge mechanism 30 feeds air to a cathode of the fuel cell 40 and discharges air from the cathode in accordance with control of the control unit 90. The air feed and discharge mechanism 30 includes a compressor 31, an air feed channel 32, a shunt valve 33, a pressure regulating valve 36, a rectification mesh 37, a bypass channel 38 and the air discharge channel 39.

The air feed channel 32 is a pipe connected to a feed port of the cathode of the fuel cell 40. The air discharge channel 39 is a pipe connected to a discharge port of the cathode of the fuel cell 40. The bypass channel 38 is a pipe which branches at an upstream side of the fuel cell 40 on the air feed channel 32 and is connected to the air discharge channel 39. The compressor 31 is provided in the middle of the air feed channel 32 and intakes and compresses air from the open air port side of the air feed channel 32. The position where the compressor 31 is provided is a position closer to the open air port than the connection site of the air feed channel 32 and the bypass channel 38.

The shunt valve 33 is provided, on the air feed channel 32, on the downstream side of the compressor 31, that is, at the connection site of the air feed channel 32 and the bypass channel 38 between the compressor 31 and the fuel cell 40. The shunt valve 33 switches a direction of a flow of air flowing from the compressor 31 between the fuel cell 40 side and the bypass channel 38 side. The shunt valve 33 as above is also called a three-way valve. The bypass channel 38 is a pipe connecting the shunt valve 33 and the air discharge channel 39 together. The pressure regulating valve 36 is provided, on the air discharge channel 39, more on the fuel cell 40 side than the connection site of the air discharge channel 39 and the bypass channel 38. The pressure regulating valve 36 adjusts a channel sectional area of the air discharge channel 39 in response to the degree of opening. The pressure regulating valve 36 is composed of a butterfly valve. The rectification mesh 37 rectifies a turbulent flow caused by passing through the pressure regulating valve 36. After the air having passed through the pressure regulating valve 36 passes through the rectification mesh 37 and its connection site to the bypass channel 38, it is discharged from an open air port to the ambient air. The compressor 31, the shunt valve 33 and the pressure regulating valve 36 are controlled by the control unit 90.

The cooling water circulation mechanism 80 cools the fuel cell 40 in accordance with control of the control unit 90. The cooling water circulation mechanism 80 includes a radiator 81, a cooling water pump 82, a cooling water discharge channel 83 and a cooling water feed channel 84.

The cooling water feed channel 84 is a channel connecting the radiator 81 to the fuel cell 40 and is a pipe for feeding cooling water to the fuel cell 40. The cooling water discharge channel 83 is a channel connecting the fuel cell 40 to the radiator 81. The cooling water discharge channel 83 is a pipe for discharging the cooling water from the fuel cell 40. The cooling water pump 82 is provided on the cooling water feed channel 84 between the radiator 81 and the fuel cell 40. The cooling water is circulated by the cooling water pump 82.

The control unit 90 is configured as a computer including a CPU, a RAM and a ROM. The control unit 90 is specifically an electronic control unit (ECU). The control unit 90 outputs signals for controlling operation of the fuel cell system 20. The control unit 90 receives a power generation request and controls the components of the fuel cell system 20 to cause the fuel cell 40 to generate electric power.

Note that, their illustration and detailed description omitted, the fuel cell system 20 implemented in a vehicle further includes a secondary battery, and a DC/DC converter which controls the output voltage of the fuel cell 40 and charge/discharge of the secondary battery. The secondary battery stores electric power output by the fuel cell 40 and regenerated power and functions as an electric power source along with the fuel cell 40.

Figure 2:
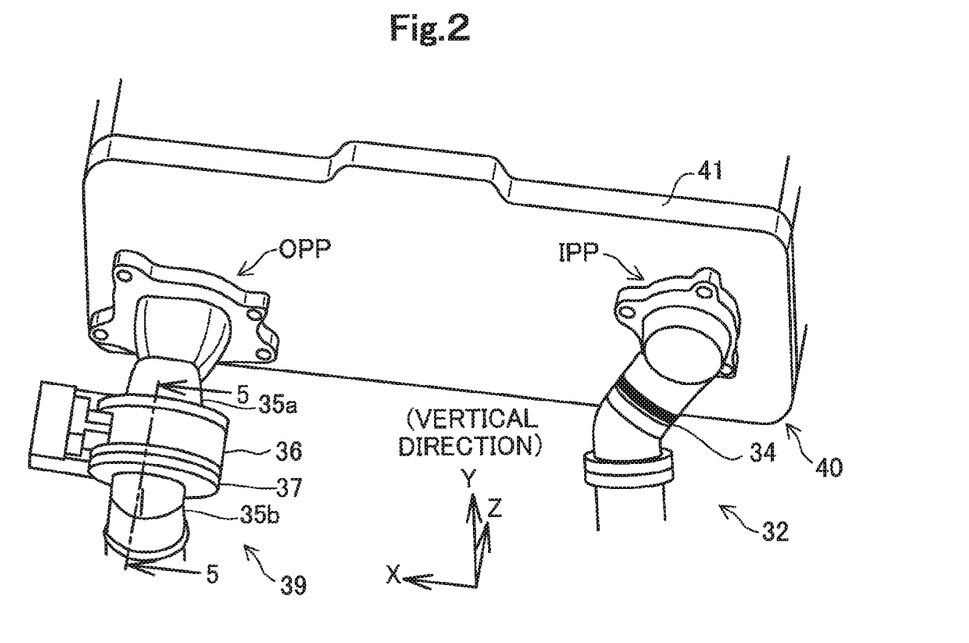
FIG. 2 is a schematic perspective view showing surroundings of parts where an air feed channel and an air discharge channel are connected to a fuel cell.

FIG. 2 is a schematic perspective view showing surroundings of parts where the air feed channel 32 and the air discharge channel 39 are connected to the fuel cell 40. Signs X, Y and Z shown in FIG. 2 denote directions perpendicular to one another. The Y-direction is the direction of gravity (vertical direction), and the X-direction and the Z-direction are horizontal directions. The fuel cell 40 includes a stacked body having a plurality of unit cells parallel to the XY-plane stacked along the Z-direction. In the fuel cell 40, a thick plate-like stack manifold 41 along the XY-plane is provided in one end part of the stacked body in its stacking direction (Z-direction).

The stack manifold 41 is an interface that respectively couples air feed channels and air discharge channels inside the fuel cell 40 to the air feed channel 32 and the air discharge channel 39 of the air feed and discharge mechanism 30 (FIG. 1). Moreover, the stack manifold 41 is an interface that respectively couples hydrogen feed channels and hydrogen discharge channels inside the fuel cell 40 to the hydrogen feed channel 60 and the gas liquid separation unit 56 of the hydrogen feed and discharge mechanism 50 (FIG. 1). Furthermore, the stack manifold 41 is an interface that respectively couples cooling water feed channels and cooling water discharge channels inside the fuel cell 40 to the cooling water feed channel 84 and the cooling water discharge channel 83 of the cooling water circulation mechanism 80 (FIG. 1). Note that, for easy understanding of the technology, FIG. 2 only shows the connections of the air feed channel 32 and the air discharge channel 39 to the stack manifold 41, omitting connections of the other channels.

Out of the air feed channel 32, an inlet pipe 34 from the shunt valve 33 (FIG. 1) toward the stack manifold 41 is connected to an air feed port (not shown) of the stack manifold 41 via an inlet pipe plate IPP. Moreover, out of the air discharge channel 39, an outlet pipe 35a coupling the stack manifold 41 and the pressure regulating valve 36 together is connected to an air discharge port (not shown) of the stack manifold 41 via an outlet pipe plate OPP. The outlet pipe 35a is set to be a pipe parallel to the Z-direction (horizontal direction).

Figure 3:
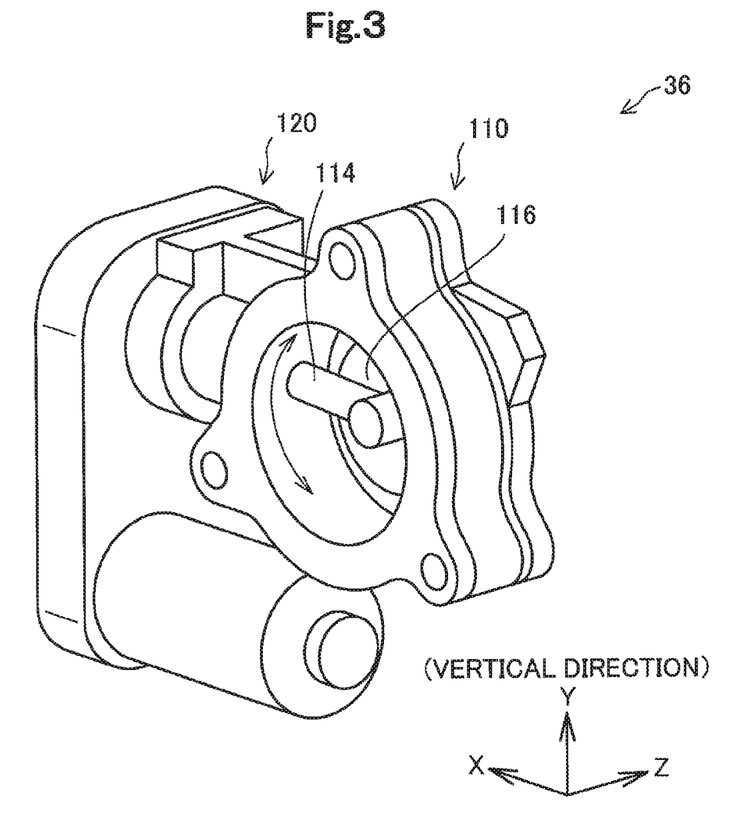
FIG. 3 is a schematic perspective view showing a configuration of a pressure regulating valve.

FIG. 3 is a schematic perspective view showing a configuration of the pressure regulating valve 36. The pressure regulating valve 36 is provided at the downstream end of the outlet pipe 35a (see FIG. 2). As mentioned above, a butterfly valve is used as the pressure regulating valve 36. Hereafter, the pressure regulating valve 36 is also called the "butterfly valve 36".

The butterfly valve 36 includes a butterfly body 110 and a drive unit 120. In a tubular internal space of the butterfly body 110, a valve rod 114 and a disc-shaped valve body 116 which rotates around the valve rod 114 as its rotational axis are included. The butterfly body 110 is disposed such that the valve rod 114 takes the state where it is along the X-direction. The drive unit 120 is an actuator which rotates the valve rod 114 and can be composed of an electric actuator, a pneumatic actuator, a hydraulic actuator or the like. In the present embodiment, the drive unit 120 is an electric actuator using an electric motor.

The rectification mesh 37 is provided continuously to the butterfly body 110 in FIG. 3 on the downstream side of the butterfly valve 36, that is, on the opposite side to the outlet pipe 35a (see FIG. 2). Note that the term "continuously to" represents not only the configuration in which the rectification mesh 37 is directly connected to the butterfly body 110 so as to be in contact with the butterfly body 110 but also the configuration in which the rectification mesh 37 is connected to the butterfly body 110 via an interface for connection therebetween. That the rectification mesh 37 is provided continuously to the butterfly body 110 means the state where the flow of gas in the channel is not disturbed between the butterfly body 110 and the rectification mesh 37.

Figure 4:
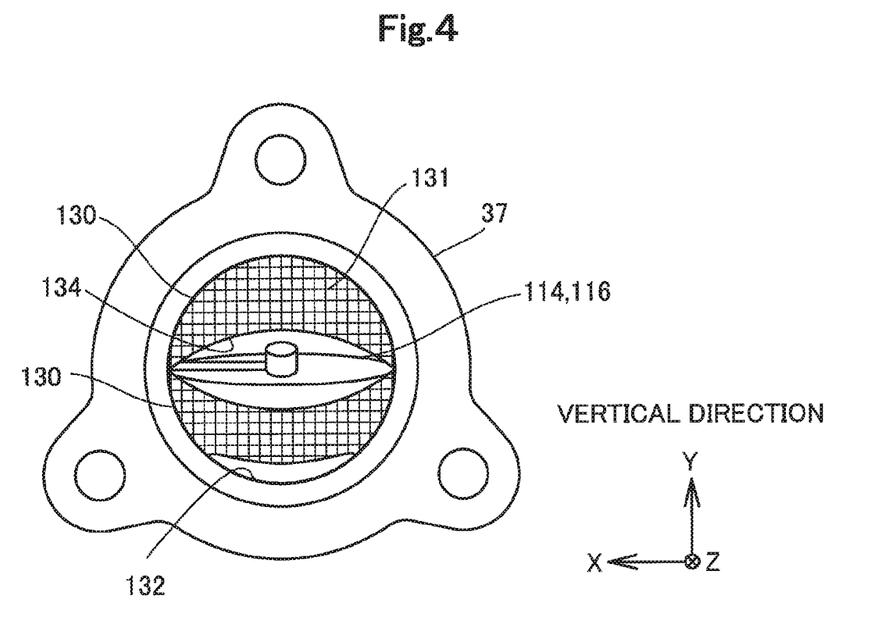
FIG. 4 is a schematic front view showing a configuration of a rectification mesh in FIG. 2.

FIG. 4 is a schematic front view showing a configuration of the rectification mesh 37 in FIG. 2. FIG. 4 shows the rectification mesh 37 as seen from the opposite side to the butterfly valve 36 (see FIG. 2), that is, as seen from the downstream side of the rectification mesh 37. In the tubular internal space, the rectification mesh 37 has a mesh part 130. In the mesh part 130, a mesh 131 is formed along the XY-plane (vertical plane). Moreover, the rectification mesh 37 has, in its lower end part in the vertical direction (Y-direction), a first opening part 132 in which the mesh 131 is not formed. Furthermore, the rectification mesh 37 has, at the center in the vertical direction, a second opening part 134 in which the mesh 131 is not formed. Note that shapes of the first opening part 132 and the second opening part 134 are mentioned later.

A discharge pipe 35b constituting the air discharge channel 39 is connected to the downstream side of the rectification mesh 37 in FIG. 2. The discharge pipe 35b has a shape which bends obliquely downward from an orientation along the Z-direction (horizontal direction).

Figure 5:
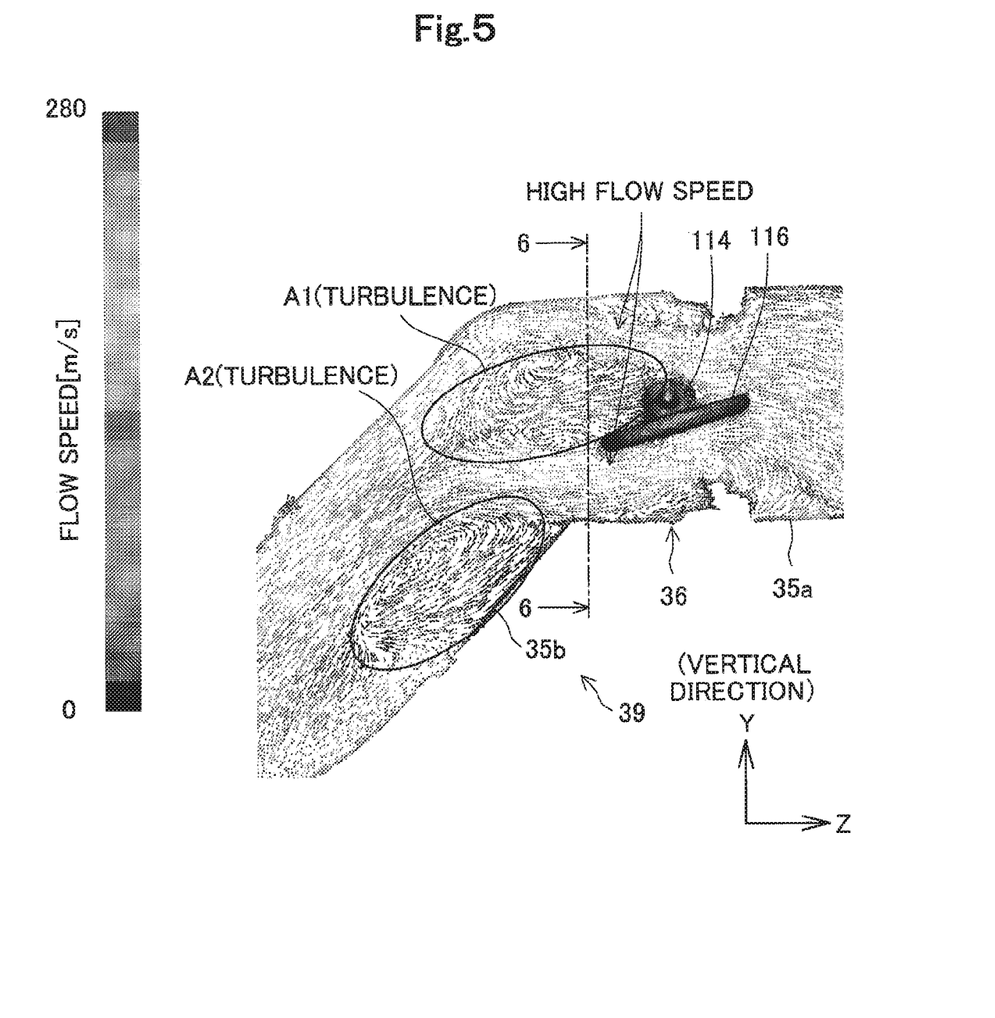
FIG. 5 is an explanatory diagram showing a situation of a flow of air flowing from an outlet pipe toward a discharge pipe in the state where the rectification mesh is not provided, in a cross section as seen along the 5-5 arrows in FIG. 2.

FIG. 5 is an explanatory diagram showing a situation of the flow of air flowing from the outlet pipe 35a toward the discharge pipe 35b in the case where the rectification mesh 37 is not provided, in a cross section as seen along the 5-5 arrows in FIG. 2. Moreover, FIG. 6 is an explanatory diagram showing a flow speed distribution of the air in a cross section as seen along the 6-6 arrows in FIG. 5.

As shown in FIG. 5, since air passing through the butterfly valve 36 is very high in flow speed, turbulence in which the flow is irregularly turbulent occurs when the rectification mesh 37 is not provided. In such circumstances, in a spatial region A1 on the downstream side of the valve body 116 along the horizontal direction (Z-direction), the flow rate of the air flowing in from the upstream side is low, and a turbulent flow which goes around and comes in reverse from the downstream side flows therein. Moreover, also in a spatial region A2 shown in FIG. 5, the flow rate of the air flowing in from the upstream side is low, and a turbulent flow which goes around and comes in reverse from the downstream side flows therein. The spatial region A2 is positioned in a lower part of the space at a bending portion of the discharge pipe 35b, at which the discharge pipe 35b bends obliquely downward from its elongation along the horizontal direction (Z-direction).

In the present embodiment, the rectification mesh 37 (see FIG. 2 and FIG. 4) is disposed downstream of the butterfly valve 36 as mentioned above. Specifically, as indicated by broken lines in FIG. 6, the mesh part 130 is arranged in regions of fluid which is high in flow speed and generates turbulence. The mesh part 130 can rectify gas such that a turbulent flow occurring due to a high flow of air in flow speed becomes a laminar flow. As a result, noise caused by a turbulent flow can be reduced.

Figure 6:
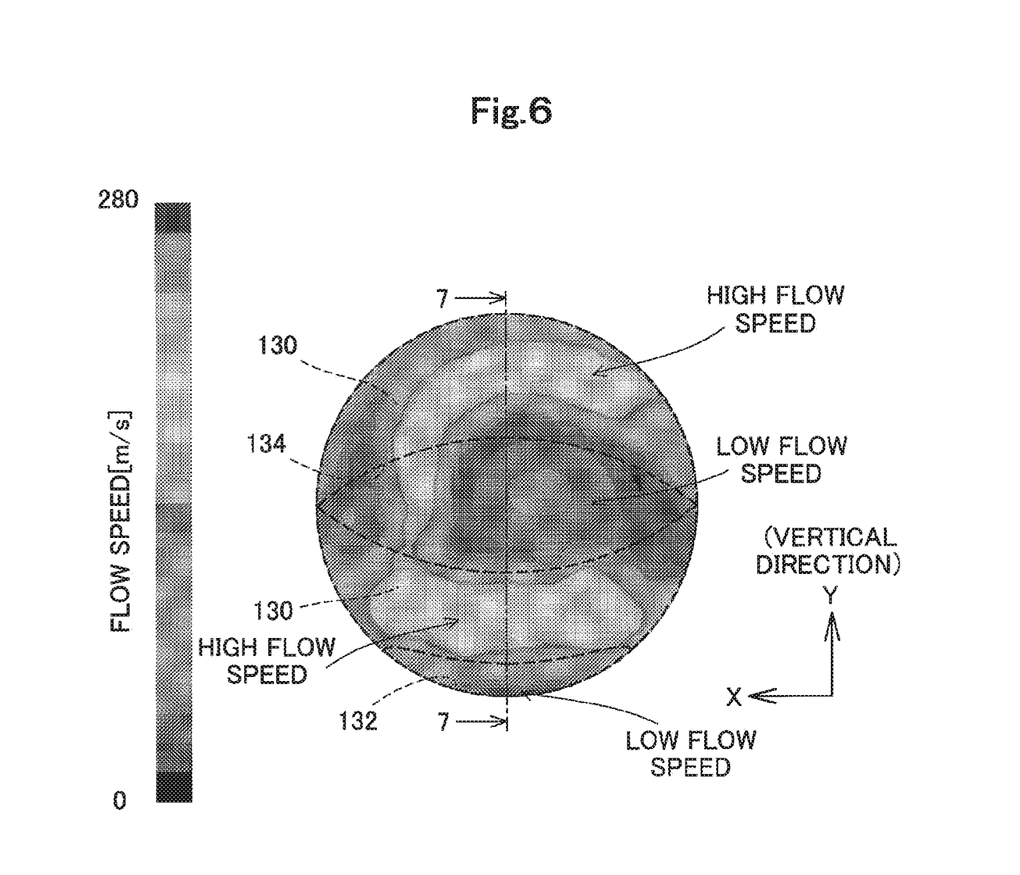
FIG. 6 is an explanatory diagram showing a flow speed distribution of the air in a cross section as seen along the 6-6 arrows in FIG. 5.

Moreover, in the present embodiment, as indicated by broken lines in FIG. 6, the first opening part 132 is disposed in a lower end part in the vertical direction. Thus, liquid water flowing in the lower end part of the discharge pipe 35b (see FIG. 5) from the fuel cell 40 can be caused to flow downstream via the first opening part 132. Therefore, a situation, in which generated water flowing in a lower end part adheres to and stagnates on a mesh and a pressure loss in a channel of a pipe increases, can be suppressed. Note that, since the lower end part in the vertical direction is low in flow speed as shown in FIG. 6, it can be considered that the lower end part less affects the occurrence of turbulence and the influence on the rectification effect in total is small even in the case of no mesh 131 therein.

Moreover, in the present embodiment, as indicated by broken lines in FIG. 6, the second opening part 134 is disposed in a center part in the vertical direction (Y-direction). Thus, the channel is highly possibly not closed due to the second opening part 134 which widely opens, even when water adheres to and freezes on the mesh part 130 and water stagnates and freezes on the first opening part 132 and, as a result, the mesh part 130 and the first opening part 132 to be entirely blocked. Namely, blocking of the channel can be more effectively suppressed. Note that a region in which the second opening part 134 is disposed is a region on the downstream side of the butterfly valve 36 in the horizontal direction (Z-direction) (see FIG. 5). Since this region is low in flow speed as shown in FIG. 6, it can be considered that this region less affects the occurrence of turbulence due to no mesh 131 therein, and as a result, the influence on the rectification effect is small.

Note that, as shown in FIG. 4, the second opening part 134 has a shape which encloses a region obtained by projecting the butterfly valve 36 (specifically, the valve rod 114 and the valve body 116), at a predetermined maximum degree of opening, on the rectification mesh 37 (for example, a shape configured of a pair of arcs in axial symmetry). This shape well matches the shape of the region, downstream of the butterfly valve 36 (see FIG. 5), which is low in flow speed and in which the influence on the rectification effect is small even in the case of no mesh 131 therein.

As described above, in the present embodiment, the rectification mesh 37 provided downstream of the butterfly valve 36 can rectify turbulence of air having passed through the butterfly valve 36. As a result, vibration caused by turbulence is suppressed and occurrence of noise is suppressed. Moreover, in the rectification mesh 37 of the present embodiment, the first opening part 132 is provided in a lower end part of a pipe in the vertical direction. In the lower end part of a pipe, flow speed of the air having passed through the butterfly valve 36 is small. As a result, the lower end part of a pipe has small influence on turbulence. Accordingly, the first opening part 132 can suppress increase of a pressure loss in a channel caused by stagnation of generated water flowing in this lower end part. Furthermore, the second opening part 134 provided in a center part of the rectification mesh 37 in the vertical direction can suppress blocking of the channel caused by freezing of generated water.

B. Modifications

Note that the disclosure is not limited to the aforementioned embodiment or its modifications but can be implemented in various modes without departing from the spirit thereof. For example, the following modifications are also possible.

B1. Modification 1

For the aforementioned embodiment, a configuration has been exemplarily described in which the first opening part 132 is provided in a lower end part of the rectification mesh 37 in the vertical direction and the second opening part 134 is provided in a center part thereof in the vertical direction. Here, the second opening part 134 may also be omitted. Note that there is a less possibility of blocking of a channel in freezing for the mode of including the second opening part 134 than for the mode of not including the second opening part 134.

B2. Modification 2

For the aforementioned embodiment, the shape of the second opening part 134 has been described as a shape which encloses a region obtained by projecting the butterfly valve 36 (specifically, the valve rod 114 and the valve body 116) at a predetermined maximum degree of opening on the rectification mesh 37 along the horizontal direction (Z-direction). However, embodiments are not limited to this. Namely, the second opening part 134 may have an opening having a certain shape in which the mesh 131 is not formed along the axial direction of rotation in a center part of the rectification mesh.

B3. Modification 3

For the aforementioned embodiment, a configuration has been exemplarily described in which the valve body 116 of the butterfly valve 36 is disposed to take an orientation such that the valve body 116 rotates with its rotational axis being in the horizontal direction (X-direction) with respect to the outlet pipe 35*a* along the horizontal direction (Z-direction) (with respect to the flow direction of the channel along the horizontal direction) (see FIG. 3 and FIG. 4). However, embodiments are not limited to this.

Figure 7:
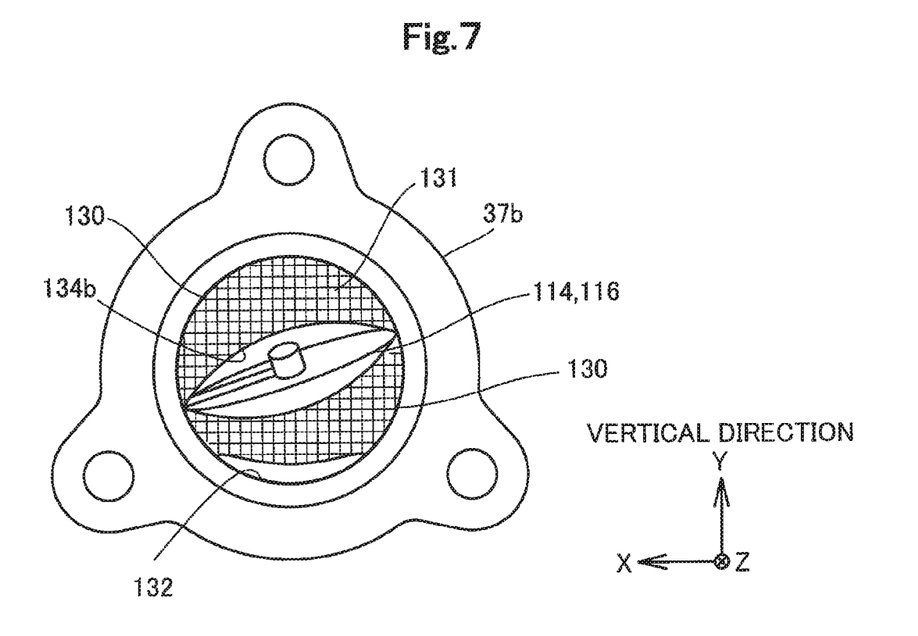
FIG. 7 is a schematic front view showing a rectification mesh having a second opening part in accordance with a modification.

FIG. 7 is a schematic front view showing a rectification mesh 37*b* having a second opening part 134*b* in accordance with a modification. FIG. 7 shows a mode in which the valve rod 114 is disposed to be inclined relative to the vertical direction (Y-direction) and the horizontal direction (X-direction). In this mode, the valve body 116 rotates with its rotational axis being in a direction inclined relative to the vertical direction and the horizontal direction. In this case, the second opening part 134*b* may be formed along the inclined axial direction of rotation in the rectification mesh 37*b* to have a shape similar to that of the second opening part 134 (see FIG. 4).

Note that the aforementioned embodiment is more desirable than this mode in that the rectification effect by the mesh part 130, the effect of suppressing a pressure loss by the first opening part 132, and the effect of suppressing blocking by the second opening part 134 are more efficiently attained in a mode, as in the aforementioned embodiment, where the valve body 116 is disposed to take the orientation such that the valve body 116 rotates with its rotational axis being in the horizontal direction (X-direction). Moreover, when the valve rod 114 of the valve body 116 is disposed along the vertical direction (Y-direction), there is a concern that the valve rod 114 as the rotational axis possibly freezes with generated water staying on a lower end part thereof in the vertical direction. On the other hand, when the valve rod 114 of the valve body 116 is disposed in the horizontal direction (X-direction), it can be most effectively suppressed that generated water adheres to and freezes on the valve rod 114 as the rotational axis.

B4. Modification 4

For the aforementioned embodiment and modifications, configurations have been exemplarily described in which each of the butterfly valve 36 and the rectification mesh 37 is disposed along the vertical plane (XY-plane) on a pipe whose flow direction is the horizontal direction (Z-direction). However, embodiments are not limited to these. Here, it is not favorable that the butterfly valve 36 and the rectification mesh 37 are disposed on a pipe whose flow direction is the vertical direction (Y-direction).

B5. Modification 5

For the aforementioned embodiment, the pressure regulating valve 36 for which a butterfly valve is used on the air discharge channel 39 of the fuel cell 40, and the rectification mesh 37 disposed downstream thereof are exemplarily described. However, embodiments are not limited to this. The disclosed technology can be applied to a butterfly valve on another gas channel and a rectification mesh disposed downstream thereof.

The disclosure is not limited to any of the embodiment and its modifications described above but may be implemented by a diversity of configurations without departing from the scope of the disclosure. For example, the technical features of any of the above embodiments and their modifications may be replaced or combined appropriately, in order to solve part or all of the problems described above or in order to achieve part or all of the advantageous effects described above. Any of the technical features may be omitted appropriately unless the technical feature is described as essential in the description hereof. The present disclosure may be implemented by aspects described below.

(1) According to an aspect of the disclosure, a fuel cell system is provided. This fuel cell system has: a butterfly valve provided on a pipe between a fuel cell and another component; and a rectification mesh provided on a downstream side of the butterfly valve along a direction of flow of gas flowing in the pipe. The rectification mesh has a mesh that rectifies a flow of the gas. The rectification mesh has a first opening part in its lower end part in a vertical direction. The mesh is not formed in the first opening part.

According to the fuel cell system of this aspect, the first opening part can suppress a possibility that generated water which is generated in the fuel cell and flows in a lower end part of the pipe in the vertical direction adheres to the mesh. Thus, a possibility that the generated water flowing in the lower end part of the pipe in the vertical direction increases a pressure loss in a channel of the pipe can be suppressed. Moreover, by the mesh rectifying a turbulent flow occurring in the gas having passed through the butterfly valve, noise caused by the turbulent flow can be reduced.

(2) In the fuel cell system in accordance with the aforementioned aspect, in a center part of the rectification mesh, the rectification mesh may further have a second opening part in which the mesh is not formed. The second opening part extends in an axial direction of rotation of a valve body of the butterfly valve.

According to the fuel cell system of this aspect, the second opening part can further suppress the possibility that the generated water increases a pressure loss in the channel of the pipe. Moreover, even when the generated water adhering to the mesh freezes and when the first opening part is blocked due to freezing of the generated water, there is a low possibility that the second opening part in the center part is blocked. Hence, even in such circumstances, gas can be caused to flow through the second opening part, which can suppress complete blocking.

(3) In the fuel cell system in accordance with the aforementioned aspect, the second opening part may be formed so as to enclose a region obtained by projecting the butterfly valve at a predetermined maximum degree of opening on the rectification mesh along the direction of the flow of the gas.

According to the fuel cell system of this aspect, a rectification effect by the mesh that is other part than the second opening part, and an effect of suppressing blocking of the channel due to freezing of the generated water by the second opening part can be efficiently attained.

(4) In the fuel cell system in accordance with the aforementioned aspect, the butterfly valve may be disposed in an orientation such that a valve body rotates with a horizontal direction.

According to the fuel cell system of this aspect, the rectification effect by the mesh can be efficiently enhanced. Moreover, according to the aspect having the first opening part, increase of a pressure loss in the channel due to the generated water flowing in the lower end part of the pipe in the vertical direction can be suppressed. Moreover, according to the aspect having the second opening part, blocking of the channel can be suppressed. Moreover, when the rotational axis of the valve body is in the vertical direction, there is a concern that the rotational axis freezes due to generated water stagnating in the lower end part in the vertical direction. Nevertheless, when the rotational axis of the valve body is in the horizontal direction, it can be most effectively suppressed that the generated water adheres to and freezes on the rotational axis.

The disclosure can be realized in accordance with various aspects other than the fuel cell system as mentioned above. For example, it can be realized in accordance with aspects of a reactant gas feed and discharge mechanism in a fuel cell system, an air feed and discharge mechanism in a fuel cell system, rectification meshes used for these, and the like.

What is claimed is:

1. A fuel cell system comprising:
   a butterfly valve provided on a pipe between a fuel cell and another component; and
   a rectification mesh provided on a downstream side of the butterfly valve along a direction of flow of gas flowing in the pipe, the rectification mesh having a mesh that rectifies a flow of the gas, wherein
   the rectification mesh has a first opening part in a lower end part of the rectification mesh in a vertical direction, wherein the mesh is not formed in the first opening part.

2. The fuel cell system in accordance with claim 1, wherein
   in a center part of the rectification mesh, the rectification mesh further has a second opening part in which the mesh is not formed, the second opening part extending in an axial direction of rotation of a valve body of the butterfly valve.

3. The fuel cell system in accordance with claim 2, wherein the second opening part is formed so as to enclose a region obtained by projecting the butterfly valve at a predetermined maximum degree of opening on the rectification mesh along the direction of the flow of the gas.

4. The fuel cell system in accordance with claim 1, wherein the butterfly valve is disposed in an orientation such that a valve body rotates with a horizontal direction.

* * * * *